United States Patent [19]

Kira et al.

[11] 4,382,365

[45] May 10, 1983

[54] ENERGY CONVERSION DERIVED FROM PRESSURE AND TEMPERATURE DIFFERENTIALS AT DIFFERENT ELEVATIONS

[75] Inventors: Gene S. Kira, 1543 Gascony Rd., Leucadia, Calif. 92024; Jens O. Sorensen, El Acebo, P.O. Box 2274, Rancho Santa Fe, Calif. 92067

[73] Assignees: Gene Sadao Kira, Leucadia; Jens Ole Sorensen, Rancho Santa Fe, both of Calif.

[21] Appl. No.: 156,274

[22] Filed: Jun. 4, 1980

[51] Int. Cl.$^3$ .......................... F03G 7/02; F03G 7/04
[52] U.S. Cl. .................................. 60/675; 60/641.6; 60/641.11; 60/649
[58] Field of Search ............ 60/641.6, 641.11, 641.12, 60/641.14, 641.1, 675, 649, 673, 674, 641.8; 417/108

[56] References Cited

U.S. PATENT DOCUMENTS 2,265,878 12/1941 Stoker .................................. 60/675
4,106,295 8/1978 Wood .................................. 60/649

*Primary Examiner*—Allen M. Ostrager
*Attorney, Agent, or Firm*—Brown & Martin

[57] ABSTRACT

A method and system of energy conversion derived from temperature and pressure differentials that may be provided between high and low elevations. A solution of a liquid in a gas is transported in a first conduit from a low elevation to a high elevation, whereby the absolute pressure and the temperature of the solution change. Some of the liquid separates out of the solution in the first conduit in the form of particles suspended in the remaining solution to create a mixture of the separated particles and the remaining solution in the first conduit as a result of the changes in absolute pressure and temperature, so that at any particular position in the first conduit where the separation takes place, the average proportional density of the mixture after the separation has taken place is decreased in relation to the density of the solution at such position prior to the separation taking place. The mixture is transported into a separation chamber at the high elevation in response to pressure differentials created by the decrease in average proportional density of the mixture in the first conduit. At least of portion of the suspended particles are separated from the mixture in the separation chamber to create a separated liquid, and a dried gas; and the separated liquid is transported through a second conduit to a transducer at a lower elevation than the high elevation. The transducer converts the pressure and motion of the transported separated liquid into a useful form of energy.

24 Claims, 2 Drawing Figures

ENERGY CONVERSION DERIVED FROM PRESSURE AND TEMPERATURE DIFFERENTIALS AT DIFFERENT ELEVATIONS

BACKGROUND OF THE INVENTION

The present invention generally pertains to thermal energy conversion, and is particularly directed to an improvement in energy conversion derived from temperature and pressure differentials that may be provided between high and low elevations.

Examples of prior art systems based upon this principle are described in U.S. Pat. No. 3,894,393 to Carlson for Power Generation Through Controlled Convection; (Aereoelectric Power Generation); U.S. Pat. No. 4,106,295 to Wood for Air Pressure Differential Energy System; and U.S. Pat. No. 4,143,516 to Long for Air-Water Power Generator.

In the system described in U.S. Pat. No. 4,106,295, a vertical conduit is provided for transporting a solution of a liquid in a gas from a low elevation to a high elevation, whereby the absolute pressure and temperature of the solution decrease and the solution rises in response to pressure differentials created by the decrease in average proportional density in the conduit. Water vapor is injected into the conduit to increase the created pressure differential. A heat exchanger is provided at the low elevation, high atmospheric pressure end of the conduit to warm the solution. A turbine is coupled to the heat exchanger and is impelled by the warmed solution to provide a useful form of energy. The heat exchanger may derive its heat from either a geothermal energy source or from a solar energy conversion system.

In the system described in U.S. Pat. No. 4,143,516, flow of a solution of a liquid in a gas in opposite directions through vertical conduits is accelerated by evaporation of heated liquid to decrease the density of the solution entering the lower inlet end of one of the conduits in an upflow direction. Separation of the liquid from the solution adjacent the upper outlet end of the upflow conduit further accelerates the flow. The flow is thermally induced by heat exchange in the downflow conduit. The liquid may be heated by fossil and non-fossil fuels as well as by natural heat sources such as geothermal or solar energy sources. The separated liquid is recycled into the supply of heated liquid. The kinetic energy of the upward flowing solution is converted by a turbine into a useful form of energy.

SUMMARY OF THE INVENTION

The present invention provides an improved method and system of energy conversion derived from temperature and pressure differentials that may be provided between high and low elevations.

A solution of a liquid in a gas is provided at a predetermined low elevation and is transported in a first conduit to a predetermined high elevation, whereby the absolute pressure and temperature of the solution change. Liquid separates out of the solution in the first conduit in the form of particles suspended in the remaining solution to create a mixture of the separated particles and the remaining solution in the first conduit as a result of the changes in absolute pressure and temperature, so that at any particular position in the first conduit where the separation takes place, the average proportional density of the mixture after the separation has taken place is decreased in relation to the density of the solution at such position prior to the separation taking place. The mixture is transported through the first conduit into a separation chamber at the high elevation in response to pressure differentials created by the decrease in average proportional density of the mixture in the first conduit. In the separation chamber, at least some of the suspended particles are separated from the mixture to create a separated liquid and a dried gas. (The term "dried gas" does not imply zero liquid dissolved in the gas, however).

The present invention is characterized by transporting the separated liquid through a second conduit to a transducer at a lower level than the high elevation; and converting the pressure and motion of the transported separated liquid into a useful form of energy.

Additional features of the present invention are described in connection with the description of the preferred embodiments.

DESCRIPTION OF THE PREFERRED EMBODIMENTS

Figure 1:
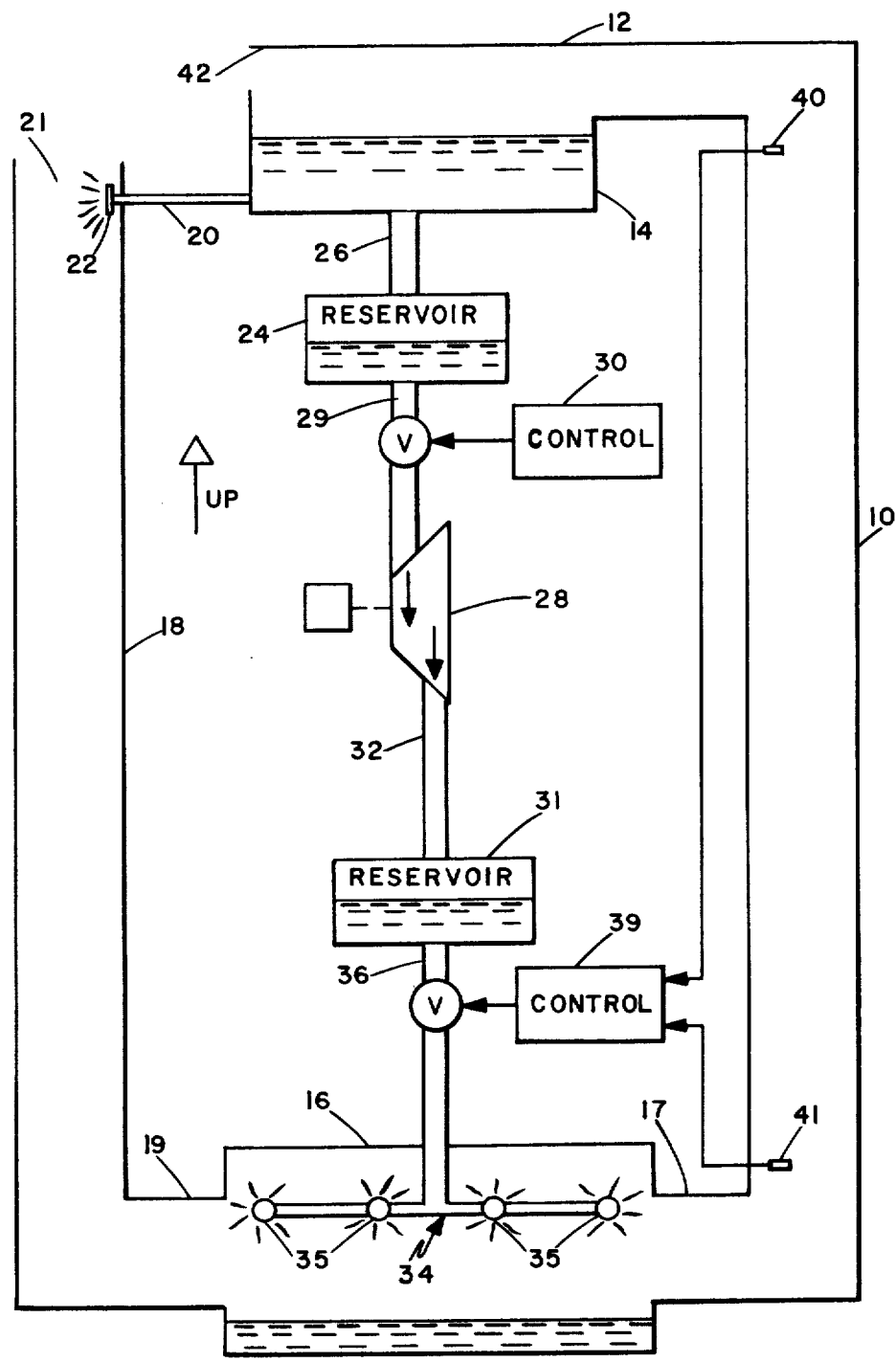
FIG. 1 is a schematic diagram of one preferred embodiment of a thermal energy conversion system according to the present invention.

The system illustrated in FIG. 1 includes a first conduit 10 for transporting a solution from a low elevation to a high elevation. In the preferred embodiments, the low elevation is at the base of a mountain; and the high elevation is high on the mountain, where the temperature and atmospheric pressure are much lower than at the base. Alternatively, the high elevation may be at the earth's surface and the low elevation may be deep in the earth at or near a geothermal energy source.

A separation chamber 12 is connected to the first conduit 10 at the high elevation. A first liquid storage reservoir 14 is included in the separation chamber 12.

A conditioning chamber 16 at the low elevation has an outlet 17 connected to the first conduit 10. A second conduit 18 is connected to an inlet 19 of the conditioning chamber 16. The second conduit 18 extends from the low elevation to a higher elevation.

A third conduit 20 extends from the first reservoir 14 to the entrance 21 of the second conduit 18. A spray nozzle 22 is provided at the end of the third conduit 20 at the entrance 21 of the second conduit 18. As used herein, "nozzle" means nozzle system.

A second, high level, liquid storage reservoir 24 is connected to the first liquid reservoir 14. The high level liquid storage reservoir 24 also is at the high elevation in relation to the low elevation, but is not necessarily at the same elevation as the first liquid reservoir 14. The liquid storage reservoir 24 is connected to the first liquid reservoir 14 by a fourth conduit 26 and preferably is at a slightly lower elevation to enable liquid to flow to the storage reservoir 24 by the force of gravity.

A transducer, such as a turbine generator 28 is located at a lower elevation than the second liquid storage reservoir 24, and is connected thereby by the fifth conduit 29.

A first control unit 30 is provided for regulating the rate at which liquid is transported through the fifth conduit 29 to the turbine generator 28.

A third, low level, liquid storage reservoir 31 is connected to the fluid outlet of the turbine generator by a sixth conduit 32. The third liquid reservoir 31 is at a lower elevation than the turbine generator 28.

A moisture injection system 34 is disposed in the conditioning chamber 16. The moisture injection system 34 includes a plurality of nozzles 35. A seventh conduit 36 connects the moisture injection system 34 to the outlet of the third liquid reservoir 31.

A second control unit 39 is provided for regulating the rate at which liquid is transported through the seventh conduit 36. Absolute pressure sensors 40 and 41 respectively disposed at the top and bottom of the first conduit 10 are connected to the second control unit 39.

The operation of the system illustrated in FIG. 1 is as follows:

A first solution of water vapor in moist air is transported through the first conduit 10 from a low elevation to a high elevation, whereby the absolute pressure and the temperature of the first solution change. Water separates out of the first solution in the first conduit 10 in the form of particles suspended in the first solution to create a mixture of the separated particles and the remaining solution in the first conduit 10 as a result of the changes in absolute pressure and temperature, so that at any particular position in the first conduit 10 where the separation takes place, the average proportional density of the mixture after the separation has taken place is decreased in relation to the density of the first solution at such position prior to the separation taking place. The water particles that are separated out of the solution can be in liquid or solid states, such as mist, rain droplets, snow or hail. The mixture is transported through the first conduit 10 into the separation chamber 12 at the high elevation in response to pressure differentials created by the decrease in average proportional density in the first conduit 10.

In the separation chamber 12, at least some of the suspended particles are separated from the mixture to create separated liquid water and dried air. The separated liquid precipitates into the first liquid reservoir 14 and the dried air flows out of the separation chamber 12 through an outlet opening 42. The size of the opening 42 can be adjusted to maintain a given pressure in the separation chamber 12. The amount of the water that precipitates out of the first solution may be increased by cooling the first solution in the separation chamber 12. One method of cooling the first solution in the separation chamber 12 is to shield the interior of the separation chamber 12 from solar radiation during the daytime and to unshield the separation chamber to permit radiation of heat into the sky at night. Other methods are discussed in relation to the description of the system illustrated in FIG. 2.

The separated liquid water is transported through the fourth conduit 26, the second reservoir 24 and the fifth conduit 29 to the turbine generator 28. The turbine generator 28 converts the pressure and motion of the transported separated liqud water into a useful form of energy.

The control unit 30 controls the rate at which the separated liquid water is transported to the turbine generator 28 in proportion to the amount of liquid needed for the energy conversion.

A second solution of water and moist air is provided in the conditioning chamber 16 at the low elevation. The second solution is conditioned in the conditioning chamber 16 to create the first solution for transportation in the first conduit 10 under conditions that tend to increase the created pressure differential in the first conduit 10. The second solution is conditioned by injecting water from the nozzles 35 into the second solution in conditioning chamber 16 to create a second mixture of the injected water and the second solution. The water is in the form of droplets, a mist or water vapor. Heat is transferred to the second mixture to vaporize the water and thereby increase the proportion of vaporized water in the first solution in the first conduit 10. This has the effect of storing latent heat of vaporization in the first solution for release as the water is condensed from the first mixture as it rises in the first conduit 10 to thereby enhance the increase in average proportional density in the first conduit 10 and thus increase the created pressure differential therein.

The second mixture in the conditioning chamber 16 may be heated by means of solar energy when the conditioning chamber 16 is transparent to sunlight and can be heated like a greenhouse. Such a transparent conditioning chamber would be positioned over a large area at the base of a mountain. Instead of a greenhouse, the conditioning chamber 16 may include an array of large transparent, flexible, plastic tubes that are inflated. These tubes are transparent on the top and black on the bottom to better absorb and retain solar energy. The absorption of solar radiation can be enhanced by mixing a dye with the gas, water and/or the solutions.

Alternatively, the second mixture can be heated by being brought into a heat exchange relationship with a warm heat reservoir stored in a warm mass, such as a geothermal heat source or storage area.

The created pressure differential in the first conduit 10 can also be increased by injecting hot water in the vapor state from the nozzles 35 into the second solution to increase the proportion of vaporized liquid in the first solution in the first conduit 10. This also has the effect storing heat and latent heat of vaporization in the first solution, with a resultant increase in the pressure differential created in the first conduit 10 as discussed above when heat is transferred to the second mixture in the conditioning chamber 16. The water can be heated prior to injection through the nozzles 35, by means of solar radiation through a greenhouse built over the low elevation liquid storage reservoir 31.

The pressure differential in the first conduit 10 can also be increased by heating the first solution in the first conduit 10 to thereby decrease the density of the first solution.

The preferred conditioning process in the conditioning chamber 16 is as follows:

Water particles are injected from the nozzles 35 into the second solution to create the second mixture of the injected particles and the second solution; and the second mixture is heated by a heat source (such as solar energy or a geothermal source), whereby some of the heat from the heat source evaporates the particles. This decreases the amount of temperature increase of the second mixture per unit of heat transferred from the heat source to thereby increase the temperature difference between the second mixture and the heat source per unit of heat transferred. This in turn increases the rate of heat transferred to the second mixture to thereby evaporate more liquid, whereby the proportion of water in the first solution is increased to enhance separation in the first conduit 10 to thereby increase the pressure differential in the first conduit 10.

The second solution in the conditioning chamber 16 is provided at an increased pressure as follows:

A third mixture of water particles and a third solution of water and air is provided in the second conduit 18. The third solution of water and air is provided from the atmosphere at the high elevation and enters the entrance 21 of the second conduit 18. Water particles are injected into the third solution through the nozzle 22 at the entrance of the second conduit 18. The water particles are provided from the first liquid storage reservoir 14 via the third conduit 20.

The third mixture is transported down through the second conduit 18, whereby the absolute pressure and temperature of the third mixture change. The particles are dissolved into the third solution in the second conduit 18 as a result of such changes in absolute pressure and temperature so that at any particular position in the second conduit 18 where the particles are dissolved, the density of the third solution after the particles are dissolved is increased from the average proportional density of the components of the third mixture before the particles dissolved at such position, to thereby provide the second solution in the lower portion of the second conduit 18.

The second solution is transported from the second conduit to the conditioning chamber 16 in response to the pressure differentials created by the increase in density in the third conduit; whereby the second solution is provided at an increased pressure due to such pressure differentials created in response to the increase in density in the second conduit 18.

In one preferred embodiment of the system of FIG. 1, the chambers 12, 16 and/or the conduits 10, 18 include flexible casings for containing the solutions and mixtures. In such an embodiment, the injection of water from the conduit 20 into the third solution at the entrance position 21 of the second conduit 18 in the form of additional water particles increases the density of the resulting mixtures and solutions in the conversion system, thereby increasing the internal absolute pressure within the flexible casings to thereby physically strengthen the conversion system by this inflationary pressure. The injected water is supplied through the conduit 20 from the first reservoir. Alternatively, particles of some liquid other than water could be supplied from a different source (not shown) through the conduit 20 and injected at the entrance position 21 of the second conduit 18 through the nozzle 22. Some liquid other than water could provide different size particles and thereby affect the density of the resulting mixtures and solutions throughout the conversion system. A liquid other than water that would be so introduced into the system would be separated from the resulting solutions and mixtures and it then could be recycled.

Water flowing from the outlet of the turbine generator 28 is transported to by the sixth conduit 32 to the third, low elevation, liquid storage reservoir 31. The seventh conduit 36 transports the water from the low elevation liquid storage reservoir 31 to the moisture injection system 34 to provide at least a portion of the water for injection into the second solution in the conditioning chamber 16.

The control unit 39 responds to the pressure differential between the top and the bottom of the first conduit 10 as sensed by the pressure sensors 40 and 41 to control the rate at which the separated liquid is transported from the low elevation liquid storage reservoir 31 to the moisture injection system 34 in proportion to the amount of injection liquid that is needed to maintain a predetermined pressure differential in the first conduit 10.

A surfactant may be added to the water in the conversion system to enhance the creation of fine water particles during injection.

Figure 2:
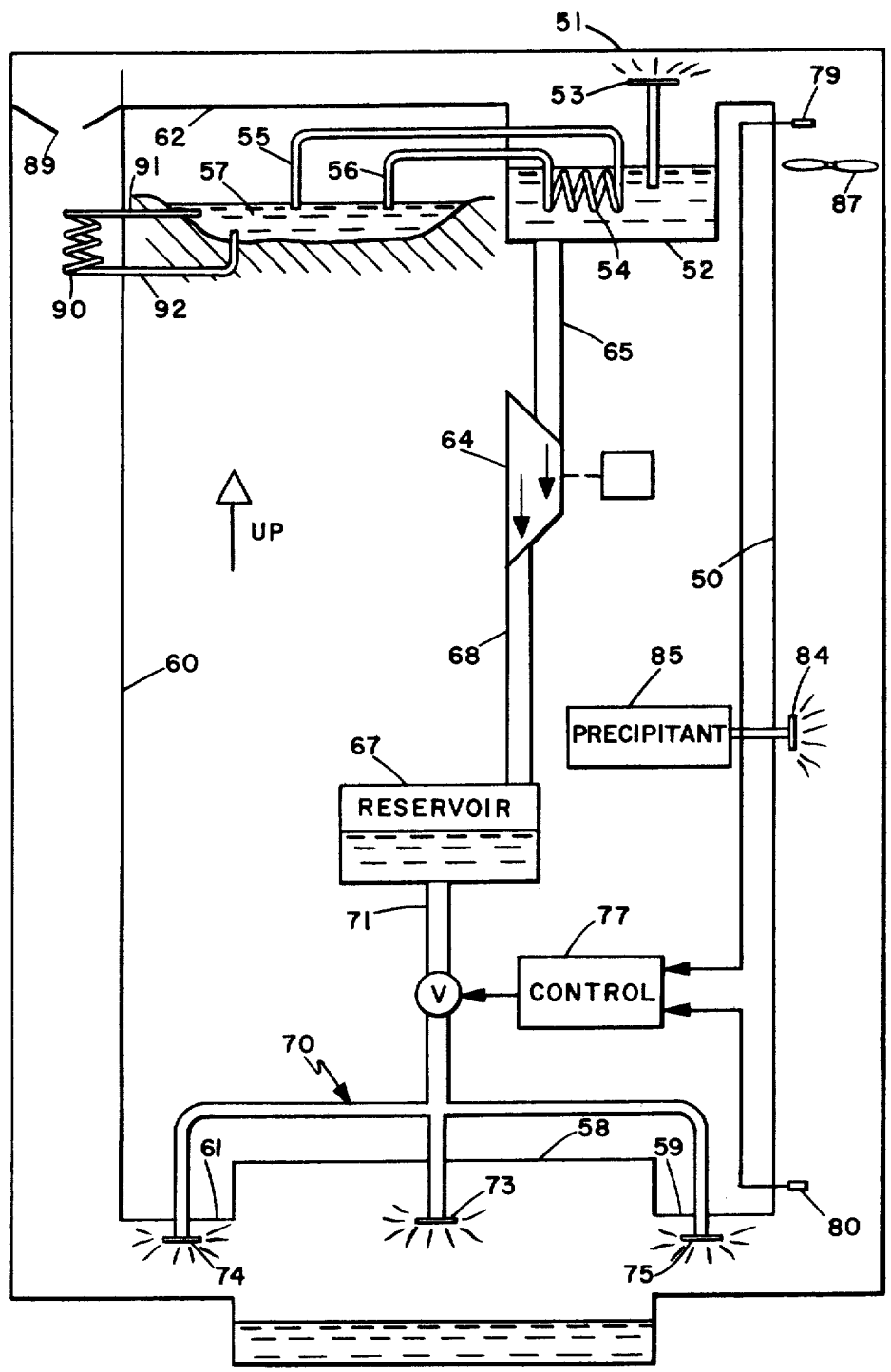
FIG. 2 is a schematic diagram of an alternative preferred embodiment of a thermal energy conversion system according to the present invention.

The alternative system illustrated in FIG. 2 includes a first conduit 50 for transporting a solution from a low elevation to a high elevation. As in the first system, it is preferable that the low elevation be at the base of a mountain and the high elevation be high on the mountain where the temperature and atmospheric pressure are much lower than at the base. Alternatively, the low elevation may be deep beneath the earth's surface proximate a geothermal energy source, and the high elevation may be at the earth's surface.

A separation chamber 51 is connected to the first conduit 50 at the high elevation. A first liquid storage reservoir 52 is included in the separation chamber 51. A moisture injection apparatus 53 is included in the separation chamber 51 above the first liquid reservoir 52.

A heat exchanger 54 is disposed in the first liquid reservoir. The heat exchanger 54 is connected to an open lake 57 at the high elevation by second and third conduits 55 and 56.

A conditioning chamber 58 at the low elevation has an outlet 59 connected to the first conduit 50. A fourth conduit 60 is connected to an inlet 61 of the conditioning chamber 58. The fourth conduit 60 extends from the low elevation to the high elevation and is connected to the high elevation to the separation chamber 51 by means of a fifth conduit 62.

A transducer, such as a turbine generator 64 is located at a lower elevation than the first liquid reservoir 52 and is connected thereto by a sixth conduit 65.

A second, low elevation liquid storage reservoir 67 is connected to the fluid outlet of the turbine generator 64 by a seventh conduit 68.

A moisture injection system 70 is connected to the liquid storage reservoir 67 by an eighth conduit 71. The moisture injection system 70 includes nozzles 73, 74 and 75 for injecting moisture into the conditioning chamber 58, the inlet 61 of the conditioning chamber and the outlet 59 of the conditioning chamber respectively.

A control unit 77 is provided for regulating the rate at which liquid is transported through the seventh conduit 71 to the moisture injection system 70. Absolute pressure sensors 79 and 80 disposed at the top and bottom of the first conduit 50 are connected to the control unit 77.

A nozzle 84 is provided in the first conduit 50 for injecting a precipitant from a reservoir 85.

A fan 87 is provided at the top of the first conduit 50; and there is a constriction 89 at the top of the fourth conduit 60.

A cold heat exchanger 90 is disposed in the top portion of the fourth conduit 60. The cold heat exchanger 90 is connected to the open lake 57 at the high elevation by ninth and tenth conduits 91 and 92.

Many of the features of the system of FIG. 2 are the same as in the system of FIG. 1.

A first solution of water vapor in moist air is transported through the first conduit 50 from a low elevation to a high elevation, whereby the absolute pressure and the temperature of the first solution change. Water separates out of the first solution in the first conduit 50 in the form of particles suspended in the first solution to create a mixture of the separated particles and the remaining solution in the first conduit 50 as a result of the changes in absolute pressure and temperature, so that at any particular position in the first conduit 50 where the separation takes place, the average proportional density of the mixture after the separation has taken place is decreased in relation to the density of the first solution at such position prior to the separation taking place. The water particles that are separated out of the solution can be in liquid or solid states, such as mist, rain droplets, snow or hail. The mixture is transported through the first conduit 50 into the separation chamber 51 at the high elevation in response to pressure differentials created by the decrease in average proportional density in the first conduit 50.

In the separation chamber 51, at least some of the suspended particles are separated from the mixture to create separated liquid water and dried air. The separated liquid precipitates into the first liquid storage reservoir 52 and the dried air flows out of the separation chamber 51 through the fifth conduit 62. The amount of water that precipitates out of the first solution may be increased by cooling the first solution in the separation chamber 51. One method of cooling the first solution in the separation chamber 51 is to shield the interior of the separation chamber 51 from solar radiation during the daytime and to upshield the separation chamber to permit radiation of heat into the sky at night.

Another method of cooling the first solution in the separation chamber 51 is to inject cooled water into the first solution from the moisture injection system 53, which draws water from the first liquid reservoir 52. The water is injected as a spray of particles.

The water in the first liquid storage reservoir 52 is maintained at a cool temperature by heat exchange with the open lake 57 through the heat exchanger 54. Water is transported between the heat exchanger 54 and the open lake 57 through the second and third conduits 55 and 56. The open lake 57 serves as a cold heat reservoir.

Heat loss in the fourth conduit 60, the separation chamber 51 and the first liquid reservoir 52 may be due to radiation, convection and conduction. Heat loss in the open lake 57 may be due to radiation, convection, conduction and evaporation.

The separated liquid water is transported through the sixth conduit 65 to the turbine generator 64. The turbine generator 64 converts the pressure and motion of the transported separated liquid water into a useful form of energy.

A second solution of water and moist air is provided in the conditioning chamber 58 at the low elevation.

The second solution is conditioned in the conditioning chamber 58 to create the first solution for transportation in the first conduit 50 under conditions that tend to increase the created pressure differential in the first conduit 50. The second solution is conditioned by injecting water from the nozzles 73 and 74 into the second solution in the conditioning chamber 58 to create a second mixture of the injected water and the second solution. The water is in the form of droplets, a mist or water vapor. Heat is transferred to the second mixture to vaporize the particles and thereby increase the proportion of vaporized water in the first solution in the first conduit 50. This has the effect of storing heat and latent heat of vaporization in the first solution for release as the water is condensed from the first mixture as it rises in the first conduit 50 to thereby enhance the increase in average proportional density in the first conduit 50 and thus increase the created pressure differential therein. Instead of a greenhouse, the conditioning chamber 58 may include an array of large transparent, flexible, plastic tubes that are inflated. These tubes are transparent on the top and black on the bottom to better absorb and retain solar energy. The absorption of solar radiation can be enhanced by mixing a dye with the gas, water and/or the solutions.

Alternatively, the first and second solutions and the injected water can be heated by being brought into a heat exchange relationship with a warm heat reservoir stored in a warm mass, such as geothermal heat source or storage area.

The created pressure differential in the first conduit 50 can also be increased by injecting hot water in the vapor state from the moisture injection system 70 into the first and second solutions to increase the proportion of vaporized liquid in the first solution in the first conduit 50. This also has the effect of storing heat and latent heat of vaporization in the first solution, with a resultant increase in the pressure differential created in the first conduit 50 as discussed above when heat is transferred to the second mixture in the conditioning chamber 58. The water can be heated prior to injection through the nozzle 73 by means of solar radiation through a greenhouse built over the low elevation liquid storage reservoir 67.

The pressure differential in the first conduit 50 can also be increased by heating the first solution in the first conduit 50 to thereby decrease the density of the first solution.

The conditioning process in the conditioning chamber 58 is explained as follows:

Water particles are injected from the nozzles 73 and 74 into the second solution to create the second mixture of the injected particles and the second solution; and the second mixture is heated by a heat source (such as solar energy or a geothermal source), whereby some of the heat from the heat source evaporates the particles. This decreases the amount of the temperature increase of the second mixture per unit of heat transferred from the heat source to thereby increase the temperature difference between the second mixture and the heat source per unit of heat transferred to the second mixture to thereby evaporate more liquid, whereby the proportion of water in the first solution is increased to enhance separation in the first conduit 50 to thereby increase the pressure differential in the first conduit 50.

The second solution is provided in the conditioning chamber 58 from the fourth conduit 60. The dried air separated from the first solution in the separation chamber 51 passes through the fifth conduit 62 and is transported downward through the fourth conduit 60. Water particles are sprayed into the dried gas in the inlet 61 of the conditioning chamber 58 from the nozzle 74 to create the second solution of water and moist air in the conditioning chamber 58. Thus, in effect, at least a portion of the dried air is recirculated. Such recirculation conserves gas, liquid, heat and/or additives contained in the dried air. Such recirculation also causes at least a portion of the second solution to be provided at an increased temperature as a result of the conserved heat contained in the dried gas within the conduit system and thereby increases the proportion of water vapor in the second solution in the conditioning chamber 58.

The dried air in the fourth conduit 60 is cooled to increase the density of the air in the third conduit to thereby provide the second solution at an increased pressure. The dried air in the fourth conduit 60 is cooled by transferring water from the open lake 57 to the cold heat exchanger 90 disposed in the top portion of the fourth conduit 60.

Water particles also may be injected into the first solution from the nozzle 75 in the outlet of the conditioning chamber 58. Such particles are injected in such proportion that some of the injected water will stay out of the solution in the form of particles as the solution and particles are transported to the separation chamber 51 at the high elevation in response to the pressure differential in the first conduit 50, to thereby provide more particles for separation from the first mixture in the separation chamber 51. Particles of some liquid other than water also may be injected to the first conduit 50 in such proportion that some of the injected liquid will stay out of the first solution in the form of particles (droplets or mist) as the solution and the particles are transported to the separation chamber 51. A liquid other than water could provide different size particles and thereby affect the density of the resulting first solution and first mixture in the first conduit 50 and thus increase the created pressure differential in the first conduit 50. A liquid other than water that would be so introduced into the system would have to be separated in the first reservoir 52 and it then could be recycled.

Water flowing from the outlet of the turbine generator 64 is transported by the seventh conduit 68 to the second, low elevation, liquid storage reservoir 67. The eighth conduit 71 transports the water from the low elevation liquid storage reservoir 67 to the moisture injection system 70 to provide at least a portion of the water for injection into the second solution in the conditioning chamber 58. The control unit 77 responds to the pressure differential between the top and the bottom of the first conduit 50 as sensed by the pressure sensors 79 and 80 to control the rate at which the separated liquid is transported from the low elevation liquid storage reservoir 67 to the moisture injection system 70 in proportion to the amount of injection liquid that is needed to maintain a predetermined pressure differential in the first conduit 50.

Also, a precipitant is injected into the first solution in the conduit 50 through a nozzle 84 from a reservoir 85 to aid separation out of the first solution of water in the form of particles and to prevent super saturation of the first solution. Alternatively, the precipitant may be provided elsewhere in the system. Because the precipitant is recirculated, it need not be provided continuously.

By providing at least a portion of the injected water from the liquid separated in the separation chamber 51, there is a resultant conservation of water, air dissolved in the water, and/or additive mixed with the water.

Valves (not shown) are provided in the various conduits and chambers of the systems of FIGS. 1 and 2 for introducing air into the system under pressure so as to enable the respective solutions and mixtures to be provided at the desired pressures.

The internal pressure within the conduit system of FIG. 2 also may be controlled by operation of the fan 87 at the top of the first conduit 50. The fan 87 functions in cooperation with the constriction 89 at the top of the fourth conduit 60 to control the pressure within the separation chamber 51. Such Fans and constrictions may also be operated at other strategic locations in the system.

A waste water recovery system (not shown) also may be included to recover water that separates out of the first mixture in the first conduit 10, 50 and falls within the first conduit 10, 50 before reaching the separation chamber 12, 51. The recovered water than is recycled to the moisture injection system 34, 70 for injection into the conditioning chamber 16, 58. Such waste water recovery and injection may occur at various other strategic locations in the system.

A computerized control system (not shown) also is provided to control injection rates, flow rates and pressure throughout the conduit systems of FIGS. 1 and 2 in response to sensed climatic, light, operational and other conditions.

We claim:

1. A method of thermal energy conversion, comprising the steps of:
   (a) providing a solution of a liquid in a gas at a predetermined low elevation;
   (b) transporting the solution in a first conduit to a predetermined high elevation, whereby the absolute pressure and the temperature of the solution change;
   (c) separating some of the liquid out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place;
   (d) transporting the mixture through the first conduit into a separation chamber at the high elevation in response to pressure differentials created by the decrease in average proportional density of the mixture in the first conduit;
   (e) separating at least a portion of the suspended particles from the mixture in the separation chamber to create a separated liquid, and a dried gas; and
   characterized by
   (f) transporting the separated liquid through a second conduit to a transducer at a lower elevation than the high elevation; and
   (g) converting the pressure and motion of the transported separated liquid into a useful form of energy; and
   (h) providing a second solution of a liquid and a gas in a conditioning chamber connected to the first conduit at the low elevation;
   (i) conditioning the second solution at the low elevation to create the first-mentioned solution for transportation in the first conduit under conditions that tend to increase the created pressure differential in the first conduit; and
   further characterized by the steps of:
   (j) solar heating the first mentioned solution, the second solution and/or the injection liquid to decrease the density of the first-mentioned solution to thereby increase the pressure differential in the first conduit; and
   (k) mixing a dye with the gas, liquid and/or solution to enhance the absorption of sunlight.

2. A method of thermal energy conversion, comprising the steps of:
   (a) providing a solution of a liquid in a gas at a predetermined low elevation;

(b) transporting the solution in a first conduit to a predetermined high elevation, whereby the absolute pressure and the temperature of the solution change;

(c) separating some of the liquid out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place;

(d) transporting the mixture through the first conduit into a separation chamber at the high elevation in response to pressure differentials created by the decrease in average proportional density of the mixture in the first conduit;

(e) separating at least a portion of the suspended particles from the mixture in the separation chamber to create a separated liquid, and a dried gas; and characterized by (f) transporting the separated liquid through a second conduit to a transducer at a lower elevation than the high elevation; and (g) converting the pressure and motion of the transported separated liquid into a useful form of energy;

wherein step (a) comprises the steps of:

(h) providing a second solution of a liquid and a gas in a conditioning chamber connected to the first conduit at the low elevation;

(i) conditioning the second solution at the low elevation to create the first-mentioned solution for transportation in the first conduit under conditions that tend to increase the created pressure differential in the first conduit;

wherein step (i) comprises providing the second solution at an increased pressure by the steps of:

(j) providing a second mixture of liquid particles and a third solution of a liquid and a gas in a third conduit connected to the conditioning chamber and having an entrance position at an elevation that is higher than the elevation of said low elevation;

(k) transporting the second mixture down through the third conduit whereby the absolute pressure and temperature of the second mixture change;

(l) dissolving the particles into the third solution in the third conduit as a result of said changes in absolute pressure and temperature so that at any particular position in the third conduit where the particles are dissolved the density of the third solution after the particles are dissolved is increased from the average proportional density of the components of the second mixture before the particles are dissolved at such position, to provide said second solution;

(m) transporting the second solution to the conditioning chamber in response to pressure differentials created by the increase in density in the third conduit; whereby the second solution is provided at an increased pressure due to said pressure differentials created in response to said increase in density in the third conduit.

3. A method according to claim 2, wherein the chambers and/or the conduits include flexible casings for containing the solutions, characterized by further comprising the step of (n) injecting additional liquid into the second mixture at the entrance position of the third conduit in the form of additional particles to increase the density of the resulting mixtures and solutions in the conversion system, thereby increasing the internal absolute pressure within the flexible casing to thereby physically strengthen the conversion system by this inflationary pressure.

4. A method according to claim 2, characterized by step (j) comprising the steps of (n) providing the third solution of a liquid and a gas; and (o) injecting liquid in the form of particles into the third solution in the third conduit to provide the second mixture.

5. A method according to claims 3, or 4, characterized by the step of:

(n) adding a surfactant to the injection fluid to enhance the creation of particles during injection.

6. A method according to claim 4, characterized by the step of:

(p) providing at least a portion of the injection fluid from the liquid separated in the separation chamber, so as to conserve fluid, gas dissolved in the fluid, and/or additive mixed with the fluid.

7. A method according to claim 2, characterized by step (j) comprising the step of (n) recirculating at least a portion of the dried gas, which still contains a portion of the suspended particles from the first mentioned mixture through the third vertical conduit from the separation chamber to the conditioning chamber to provide at least a portion of said second mixture.

8. A method of thermal energy conversion, comprising the steps of:

(a) providing a solution of a liquid in a gas at a predetermined low elevation;

(b) transporting the solution in a first conduit to a predetermined high elevation, whereby the absolute pressure and the temperature of the solution change;

(c) separating some of the liquid out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place;

(d) transporting the mixture through the first conduit into a separation chamber at the high elevation in response to pressure differentials created by the decrease in average proportional density of the mixture in the first conduit;

(e) separating at least a portion of the suspended particles from the mixture in the separation chamber to create a separated liquid, and a dried gas; and characterized by (f) transporting the separated liquid through a second conduit to a transducer at a lower elevation than the high elevation; and (g) converting the pressure and motion of the transported separated liquid into a useful form of energy;

wherein step (a) comprises the steps of:

(h) providing a second solution of a liquid and a gas in a conditioning chamber connected to the first conduit at the low elevation;

(i) conditioning the second solution at the low elevation to create the first-mentioned solution for transportation in the first conduit under conditions that tend to increase the created pressure differential in the first conduit;

wherein step (h) comprises the step of:

(j) recirculating at least a portion of the dried gas through a third vertical conduit connecting the separation chamber to the conditioning chamber to provide at least a portion of said second solution in order to conserve gas, liquid and/or additives contained in the dried gas.

9. A method of thermal energy conversion, comprising the steps of:

(a) providing a solution of a liquid in a gas at a predetermined low elevation;

(b) transporting the solution in a first conduit to a predetermined high elevation, whereby the absolute pressure and the temperature of the solution change;

(c) separating some of the liquid out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place;

(d) transporting the mixture through the first conduit into a separation chamber at the high elevation in response to pressure differentials created by the decrease in average proportional density of the mixture in the first conduit;

(e) separating at least a portion of the suspended particles from the mixture in the separation chamber to create a separated liquid, and a dried gas; and characterized by (f) transporting the separated liquid through a second conduit to a transducer at a lower elevation; and (g) converting the pressure and motion of the transported separated liquid into a useful form of energy;

wherein step (a) comprises the steps of:

(h) providing a second solution of a liquid and a gas in a conditioning chamber connected to the first conduit at the low elevation;

(i) conditioning the second solution at the low elevation to create the first-mentioned solution for transportation in the first conduit under conditions that tend to increase the created pressure differential in the first conduit;

wherein step (i) comprises the step of:

(j) recirculating at least a portion of the dried gas through a third vertical conduit connecting the separation chamber to the conditioning chamber to provide at least a portion of said second solution at an increased temperature in order to conserve heat contained in the dried gas within the conduit system and thereby increase the proportion of vapor in the second solution.

10. A method according to claim 2, 8 or 9, characterized by further comprising the additional step of:

(n) cooling the fluid in the third conduit to increase the density of the fluid in the third conduit to provide the second solution at an increased pressure.

11. A method of thermal energy conversion, comprising the steps of:

(a) providing a solution of a liquid in a gas at a predetermined low elevation;

(b) transporting the solution in a first conduit to a predetermined high elevation, whereby the absolute pressure and the temperature of the solution change;

(c) separating some of the liquid out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place;

(d) transporting the mixture through the first conduit into a separation chamber at the high elevation in response to pressure differentials created by the decrease in average proportional density of the mixture in the first conduit;

(e) separating at least a portion of the suspended particles from the mixture in the separation chamber to create a separated liquid, and a dried gas; and characterized by (f) transporting the separated liquid through a second conduit to a transducer at a lower elevation; and (g) converting the pressure and motion of the transported separated liquid into a useful form of energy;

(h) injecting liquid into the solution at the low elevation in such proportion that some of the injected liquid will stay out of the solution in the form of particles as the solution and particles are transported to the separation chamber at the high elevation in response to said pressure differentials to thereby create more particles for separation from the mixture in the separation chamber; and further (i) adding a surfactant to the injection fluid to enhance the creation of particles during injection.

12. A method of thermal energy conversion, comprising the steps of:

(a) providing a solution of a liquid in a gas at a predetermined low elevation;

(b) transporting the solution in a first conduit to a predetermined high elevation, whereby the absolute pressure and the temperature of the solution change;

(c) separating some of the liquid out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place;

(d) transporting the mixture through the first conduit into a separation chamber at the high elevation in response to pressure differentials created by the decrease in average proportional density of the mixture in the first conduit;

(e) separating at least a portion of the suspended particles from the mixture in the separation chamber to create a separated liquid, and a dried gas; and characterized by (f) transporting the separated liquid through a second conduit to a transducer at a lower elevation; and (g) converting the pressure and motion of the transported separated liquid into a useful form of energy; and by step (c) comprising the step of:

(h) providing a precipitant in the solution to aid separation out of the solution of liquid in the form of particles and to prevent super saturation of the solution.

13. A thermal energy conversion system comprising a first conduit for transporting a solution of a liquid in a gas from a predetermined low elevation to a predetermined high elevation, whereby the absolute pressure and the temperature of the solution change thereby causing some of the liquid to separate out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place; and a separation chamber connected to the first conduit at the high elevation for receiving the mixture transported through the first conduit to the high elevation in response to pressure differentials created by the decrease in average proportional density of the mixture in the first conduit, whereby at least a portion of the suspended particles are separated from the mixture in the separation chamber to create a separated liquid, and a dried gas;

characterized by a transducer at a lower elevation than the high elevation; and a second conduit for transporting the separated liquid to the transducer;

wherein the transducer is adapted for converting the pressure and motion of the transported separated liquid into a useful form of energy;

a conditioning chamber connected to the first conduit at the low elevation;

means for conditioning a second solution of a liquid and a gas in the second chamber at the low elevation to create the first-mentioned solution for transportation in the first conduit, under conditions that tend to increase the created pressure differential in the first conduit;

means for solar heating the first-mentioned solution, the second solution and/or the injection liquid to decrease the density of the first-mentioned solution to thereby increase the pressure differential in the first conduit; and means for mixing a dye with the gas, liquid and/or solution to enhance the absorption of sunlight.

14. A thermal energy conversion system comprising a first conduit for transporting a solution of a liquid in a gas from a predetermined low elevation to a predetermined high elevation, whereby the absolute pressure and the temperature of the solution change thereby causing some of the liquid to separate out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place; and a separation chamber connected to the first conduit at the high elevation for receiving the mixture transported through the first conduit to the high elevation in response to pressure differentials created by the decrease in average proportional density of the mixture in the first conduit, whereby at least a portion of the suspended particles are separated from the mixture in the separation chamber to create a separated liquid, and a dried gas;

characterized by a transducer at a lower elevation than the high elevation; and a second conduit for transporting the separated liquid to the transducer;

wherein the transducer is adapted for converting the pressure and motion of the transported separated liquid into a useful form of energy;

a conditioning chamber connected to the first conduit at the low elevation;

means for conditioning a second solution of a liquid and a gas in the second chamber at the low elevation to create the first-mentioned solution for transportation in the first conduit, under conditions that tend to increase the created pressure differential in the first conduit; and a third conduit connected to the conditioning chamber and having an entrance position at an elevation that is higher than the elevation of said low elevation for transporting a second mixture of liquid particles and a third solution of a liquid and a gas down through the third conduit;

whereby the absolute pressure and temperature of the second mixture chance, and the particles are dissolved into the third solution in the third conduit as a result of said changes in absolute pressure and temperature so that at any particular position in the third conduit where the particles are dissolved, the density of the third solution after the particles are dissolved is increased from the average proportional density of the components of the second mixture before the particles are dissolved at such position, to provide said second solution; and whereby the second solution is transported to the conditioning chamber in response to pressure differentials created by the increase in density in the third conduit to thereby provide the second solution in the second chamber at an increased pressure due to said pressure differentials created in response to said increase in density in the third conduit.

15. A system according to claim 14, wherein the chambers and/or the conduits include flexible casings for containing the solutions, characterized by further comprising means for injecting additional liquid into the second mixture at the entrance position of the third conduit in the form of additional mist to increase the density of the resulting mixtures and solutions in the conversion system, thereby increasing the internal absolute pressure within the flexible casings to thereby physically strengthen the conversion system by this inflationary pressure.

16. A system according to claim 14, characterized by means for providing the second mixture, comprising means for providing the third solution of a liquid and a gas; and means for injecting liquid in the form of particles into the third solution in the third conduit to provide the second mixture.

17. A system according to claims 15, or 16, characterized by further comprising means for adding a surfactant to the injection fluid to enhance the creation of particles during injection.

18. A system according to claim 16, characterized by means for providing at least a portion of the injection fluid from the liquid separated in the separation chamber, so as to conserve fluid, gas dissolved in the fluid, and/or additive mixed with the fluid.

19. A system according to claim 14, characterized by the third conduit being connected to the separation chamber for recirculating at least a portion of the dried gas, which still contains a portion of the suspended particles from the first-mentioned mixture from the separation chamber to the conditioning chamber to provide at least a portion of said second mixture.

20. A thermal energy conversion system comprising a first conduit for transporting a solution of a liquid in a gas from a predetermined low elevation to a predetermined high elevation, whereby the absolute pressure and the temperature of the solution change thereby causing some of the liquid to separate out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place; and a separation chamber connected to the first conduit at the high elevation for receiving the mixture transported through the first conduit to the high elevation in response to pressure differentials created by the decrease in average proportional density of the mixture in the first conduit, whereby at least a portion of the suspended particles are separated from the mixture in the separation chamber to create a separated liquid, and a dried gas;

characterized by a transducer at a lower elevation than the high elevation; and a second conduit for transporting the separated liquid to the transducer;

wherein the transducer is adapted for converting the pressure and motion of the transported separated liquid into a useful form of energy;

a conditioning chamber connected to the first conduit at the low elevation;

means for conditioning a second solution of a liquid and a gas in the second chamber at the low elevation to create the first-mentioned solution for transportation in the first conduit, under conditions that tend to increase the created pressure differential in the first conduit; and a third vertical conduit connecting the separation chamber to the conditioning chamber for recirculating at least a portion of the dried gas to provide at least a portion of said second solution in order to conserve gas, liquid and/or additives contained in the dried gas.

21. A thermal energy conversion system comprising a first conduit for transporting a solution of a liquid in a gas from a predetermined low elevation to a predetermined high elevation, whereby the absolute pressure and the temperature of the solution change thereby causing some of the liquid to separate out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place; and a separation chamber connected to the first conduit at the high elevation for receiving the mixture transported through the first conduit to the high elevation in response to pressure differentials created by the decrease in average proportional density of the mixture in the first conduit, whereby at least a portion of the suspended particles are separated from the mixture in the separation chamber to create a separated liquid, and a dried gas;

characterized by a transducer at a lower elevation that the high elevation; and a second conduit for transporting the separated liquid to the transducer;

wherein the transducer is adapted for converting the pressure and motion of the transported separated liquid into a useful form of energy;

a conditioning chamber connected to the first conduit at the low elevation;

means for conditioning a second solution of a liquid and a gas in the second chamber at the low elevation to create the first-mentioned solution for transportation in the first conduit, under conditions that tend to increase the created pressure differential in the first conduit; and a third vertical conduit connecting the separation chamber to the conditioning chamber for recirculating at least a portion of the dried gas to provide at least a portion of said second solution at an increased temperature in order to conserve heat contained in the dried gas within the conduit system and thereby increase the proportion of vapor in the second solution.

22. A system according to claims 14, 20 or 21, characterized by further comprising means for cooling the fluid in the third conduit to increase the density of the fluid in the third conduit to provide the second solution at an increased pressure.

23. A thermal energy conversion system comprising a first conduit for transporting a solution of a liquid in a gas from a predetermined low elevation to a predetermined high elevation, whereby the absolute pressure and the temperature of the solution change thereby causing some of the liquid to separate out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place; and a separation chamber connected to the first conduit at the high elevation for receiving the mixture transported through the first conduit to the high elevation in response to pressure differentials created by the decrease in average proportional density of the mixture in the first conduit, whereby at least a portion of the suspended particles are separated from the mixture in the separation chamber to create a separated liquid, and a dried gas;

characterized by a transducer at a lower elevation than the high elevation; and a second conduit for transporting the separated liquid to the transducer;

wherein the transducer is adapted for converting the pressure and motion of the transported separated liquid into a useful form of energy;

means for injecting liquid into the solution at the low elevation in such proportion that some of the injected liquid will stay out of the solution in the form of particles as the solution and particles are transported to the separation chamber at the high elevation in response to said pressure differentials to thereby create more particles for separation from the mixture in the separation chamber; and means for adding a surfactant to the injection fluid to enhance the creation of particles during injection.

24. A thermal energy conversion system comprising a first conduit for transporting a solution of a liquid in a gas from a predetermined low elevation to a predetermined high elevation, whereby the absolute pressure and the temperature of the solution change thereby causing some of the liquid to separate out of the solution in the first conduit in the form of particles suspended in the remaining solution to create a mixture of the separated particles and the remaining solution in the first conduit as a result of said changes in absolute pressure and temperature, so that at any particular position in the first conduit where the separation takes place, the average proportional density of the mixture after the separation has taken place is decreased in relation to the density of the solution at said position prior to the separation taking place; and a separation chamber connected to the first conduit at the high elevation for receiving the mixture transported through the first conduit to the high elevation in response to pressure differentials created by the decrease in average proportional density of the mixture in the first conduit, whereby at least a portion of the suspended particles are separated from the mixture in the separation chamber to create a separated liquid, and a dried gas;

characterized by a transducer at a lower elevation than the high elevation; and a second conduit for transporting the separated liquid to the transducer;

wherein the transducer is adapted for converting the pressure and motion of the transported separated liquid into a useful form of energy; and means for providing a precipitant in the solution to aid separation out of the solution of liquid in the form of particles and to prevent super saturation of the solution.

* * * * *